(12) United States Patent
Cheiky

(10) Patent No.: US 9,739,193 B2
(45) Date of Patent: Aug. 22, 2017

(54) IGNITION SYSTEM FOR LOW GRADE SYNTHESIS GAS AT HIGH COMPRESSION

(71) Applicant: V-GRID Energy Systems, Camarillo, CA (US)

(72) Inventor: Michael Cheiky, Camarillo, CA (US)

(73) Assignee: V-GRID Energy Systems, Camarillo, CA (US)

( * ) Notice: Subject to any disclaimer, the term of this patent is extended or adjusted under 35 U.S.C. 154(b) by 217 days.

(21) Appl. No.: 14/334,477

(22) Filed: Jul. 17, 2014

(65) Prior Publication Data

US 2015/0020764 A1 Jan. 22, 2015

Related U.S. Application Data

(60) Provisional application No. 61/856,235, filed on Jul. 19, 2013.

(51) Int. Cl.
*F02B 19/10* (2006.01)
*F02B 43/10* (2006.01)
(Continued)

(52) U.S. Cl.
CPC ........... *F02B 19/1019* (2013.01); *F02B 7/08* (2013.01); *F02B 19/1004* (2013.01);
(Continued)

(58) Field of Classification Search
CPC ...... F02B 19/00; F02B 19/02; F02B 19/1019; F02B 19/1023; F02B 19/108;
(Continued)

(56) References Cited

U.S. PATENT DOCUMENTS 2,826,187 A * 3/1958 Meyer .............. F02B 19/12
123/259
3,970,054 A * 7/1976 Henault ............ F02B 17/00
123/188.11

(Continued)

FOREIGN PATENT DOCUMENTS

WO 9602742 A1 2/1996

OTHER PUBLICATIONS

Patent Cooperation Treaty, International Search Report for PCT/US2014/047090, Jan. 6, 2015, pp. 1-4.

(Continued)

*Primary Examiner* — Sizo Vilakazi
*Assistant Examiner* — Kevin R Steckbauer
(74) *Attorney, Agent, or Firm* — Sheppard, Mullin, Richter & Hampton LLP

(57) ABSTRACT

An igniter system for a reciprocating piston internal combustion engine having one or more cylinders including at least one igniter per cylinder is disclosed. The igniter system can comprise: a combustion chamber connected to a main cylinder of the engine by a restricted diameter bore, wherein a lean burn fuel mixture is introduced into the combustion chamber by the normal compression stroke of the engine; a hydrogen valve that injects a hydrogen rich gas into the combustion chamber forming a mixture of hydrogen and air having a hydrogen concentration above the stoichiometric ratio for hydrogen and air in the combustion chamber; and a spark ignition source that injects hot unburned hydrogen into the main cylinder, thereby initiating ignition.

17 Claims, 5 Drawing Sheets

(51) Int. Cl.
*F02B 43/04* (2006.01)
*F02B 7/08* (2006.01)
*F02B 19/02* (2006.01)
*F02B 19/12* (2006.01)

(52) U.S. Cl.
CPC ........ *F02B 19/108* (2013.01); *F02B 19/1014* (2013.01); *F02B 43/04* (2013.01); *F02B 43/10* (2013.01); *F02B 19/02* (2013.01); *F02B 19/12* (2013.01); *F02B 2043/106* (2013.01); *Y02T 10/125* (2013.01); *Y02T 10/32* (2013.01)

(58) Field of Classification Search
CPC ...... F02B 19/1085; F02B 19/12; F02B 43/04; F02B 43/10; F02B 2043/106
See application file for complete search history.

(56) References Cited

U.S. PATENT DOCUMENTS

| | | | |
|---|---|---|---|
| 4,111,161 A | 9/1978 | Ueno et al. | |
| 4,140,090 A * | 2/1979 | Lindberg | F02B 19/108 123/1 A |
| 4,332,223 A * | 6/1982 | Dalton | F02B 19/108 123/143 B |
| 4,433,660 A * | 2/1984 | Blaser | F02B 19/12 123/255 |
| 4,471,732 A * | 9/1984 | Tozzi | F02P 9/007 123/143 B |
| 5,085,176 A * | 2/1992 | Brinkley, III | F02B 43/10 123/3 |
| 5,611,307 A * | 3/1997 | Watson | F02B 19/1014 123/254 |
| 6,739,289 B2 * | 5/2004 | Hiltner | F02B 43/10 123/253 |
| 7,021,249 B1 | 4/2006 | Christison | |
| 7,444,994 B2 | 11/2008 | Ito | |
| 7,814,883 B2 * | 10/2010 | Hotta | F02B 17/005 123/267 |
| 8,567,369 B2 * | 10/2013 | Johnson | F02B 19/1009 123/260 |
| 9,003,765 B1 * | 4/2015 | Muth | F02B 19/1019 60/39.6 |
| 2003/0200939 A1 * | 10/2003 | Hiltner | F02B 43/10 123/3 |
| 2005/0155344 A1 | 7/2005 | Kobayashi | |
| 2008/0196690 A1 * | 8/2008 | Hotta | F02B 17/005 123/274 |
| 2009/0012698 A1 | 1/2009 | Shinagawa et al. | |
| 2009/0043479 A1 | 2/2009 | Noda et al. | |
| 2009/0260592 A1 | 10/2009 | Niwa et al. | |
| 2010/0268442 A1 | 10/2010 | Kabashima et al. | |
| 2012/0118262 A1 * | 5/2012 | Johnson | F02B 19/1009 123/260 |
| 2013/0000596 A1 | 1/2013 | Diaz Escano | |
| 2013/0055985 A1 * | 3/2013 | Gruber | F02B 19/12 123/253 |

OTHER PUBLICATIONS

European Patent Office, extended European search report, Feb. 2, 2017, pp. 1-9.

* cited by examiner

IGNITION SYSTEM FOR LOW GRADE SYNTHESIS GAS AT HIGH COMPRESSION

RELATED APPLICATIONS

This application claims priority to U.S. Provisional Patent Application No. 61/856,235 filed on Jul. 19, 2013, the content of which is incorporated herein by reference in its entirety.

FIELD OF THE INVENTION

The invention broadly relates to ignition applications and, more particularly, to an ignition system for low grade synthesis gas at high compression.

BACKGROUND OF THE INVENTION

Biomass is a low cost readily available energy source that is useful for the generation of other energy types such as electricity or liquid fuel. Biomass derived energy has the added advantage that it is intrinsically carbon neutral and can also be carbon negative when residual processed carbon is placed in the ground for long term storage.

A popular intermediate product of biomass energy conversion is synthesis gas, which is produced by the high temperature partial combustion of the material. Devices which support the gasification of biomass are typically called gasifiers. Synthesis gas often includes the nitrogen from the source air supply, carbon monoxide, carbon dioxide, water vapor, and hydrogen. The carbon monoxide and hydrogen components are combustible and can be used in internal combustion engines to turn generators to make electricity.

Hydrogen is generally preferred as the principle combustion gas because of its high flame speed and very wide combustion range. However, hydrogen production typically involves the water shift reaction which requires high temperature and absorbs substantial reaction energy. A high concentration of carbon monoxide can be produced from gasifiers running at lower temperatures such as due to high material flow through the gasification-partial combustion region. This may result in higher thermal conversion efficiency from biomass to combustible gas, however, carbon monoxide rich synthesis gas is generally more difficult to burn in an internal combustion engine than a hydrogen rich gas.

Internal combustion engine efficiency is dominated by the Carnot Cycle which specifies that the maximum thermal efficiency is dictated by the engine compression ratio. For example, an air throttled spark ignition engine may have a maximum theoretical efficiency of only 35% at part load whereas a high compression diesel, at a 20:1 compression ratio has a limiting efficiency of 70%. In practice, engine frictional loads, accessories and system heat losses reduce real world engines to about half of their Carnot limit. Generally, diesels are more efficient than spark ignition engines. Diesels rely on high cetane fuels which can ignite by the high pressure alone in a diesel as the piston approaches the top of its rotational arc—(Top Dead Center or TDC). Spark ignition engines, at a lower compression ratio, rely on high octane fuels. Such fuels require a high energy spark to ignite and generally burn more slowly than high cetane diesel fuels when subjected to high pressures. Both carbon monoxide and hydrogen are rated as high octane fuels, but hydrogen has an unusually high flame speed because of its small molecular size and high reaction energy.

SUMMARY OF THE INVENTION

Embodiments of the invention are directed toward a system and process for combusting low grade carbon monoxide rich synthesis gas in a high compression engines at high thermal efficiency. In some embodiments, a base engine can comprise a conventional high compression diesel engine outfitted with a top of cylinder direct injector, wherein the intake port system is modified to allow the low grade synthesis gas primary fuel source to be mixed with the diesel's unthrottled air supply.

Embodiments of the invention are directed toward an apparatus for combusting low grade carbon monoxide rich synthesis gas, comprising: an igniter system dimensioned to fit on a host engine cylinder head of an engine having one or more cylinders, the igniter system comprising a direct injector, an igniter housing, a spark plug, and an igniter tube dimensioned to fit within the host engine cylinder head.

Although the exemplary embodiments set forth herein involve the use of single cylinder engine, the igniter system set forth herein can be applied to an engine of any size, such as comprising 1-16 cylinders, 0.1 to 5 liters per cylinder and any functional compression ratio. For a reciprocating piston internal combustion engine having one or more cylinders, each cylinder can be fitted with an igniter system with at least one igniter per cylinder.

DETAILED DESCRIPTION

In the following paragraphs, embodiments of the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
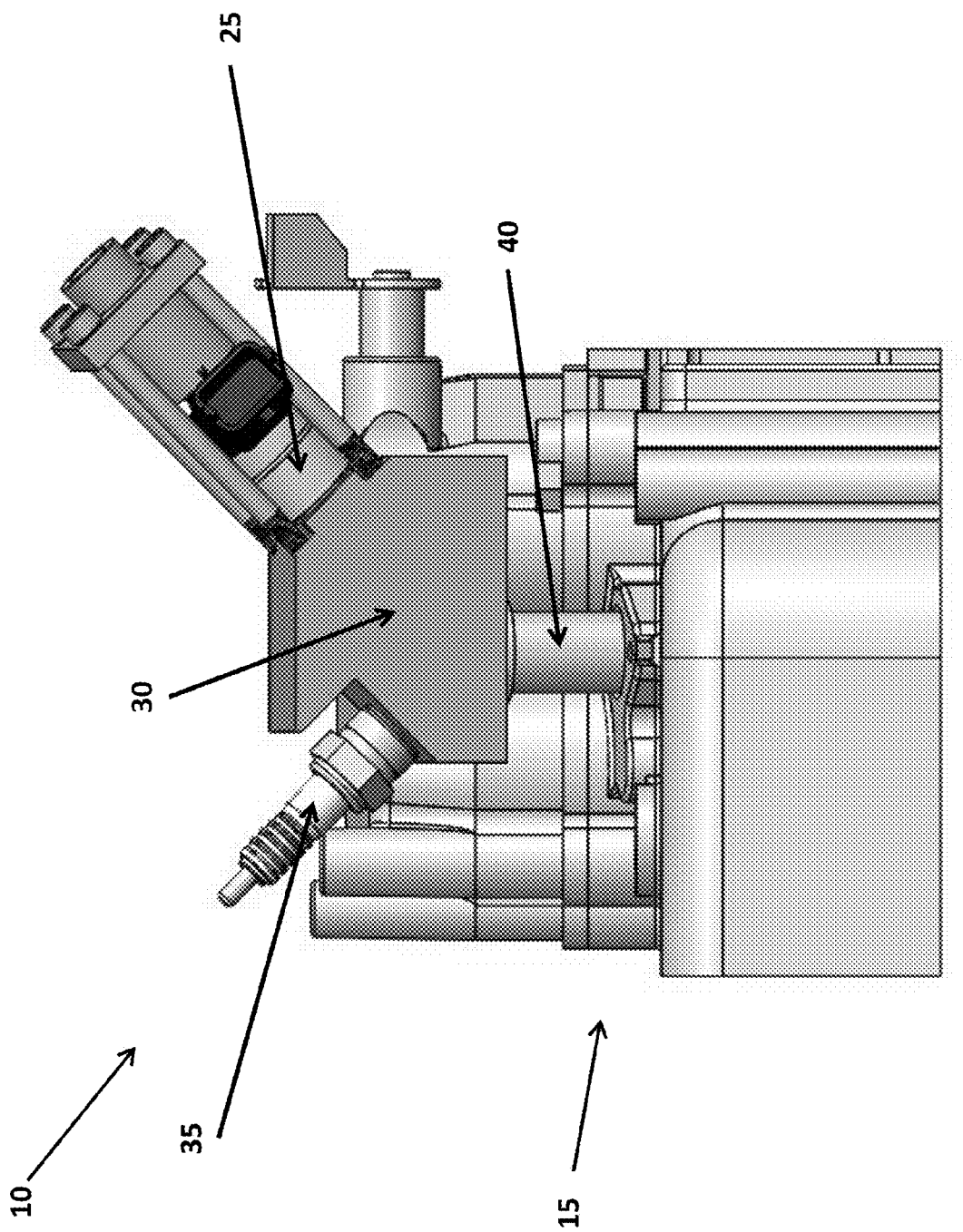
FIG. 1 is a perspective view illustrating an igniter system on a host engine cylinder head of a single cylinder engine.
Figure 2:
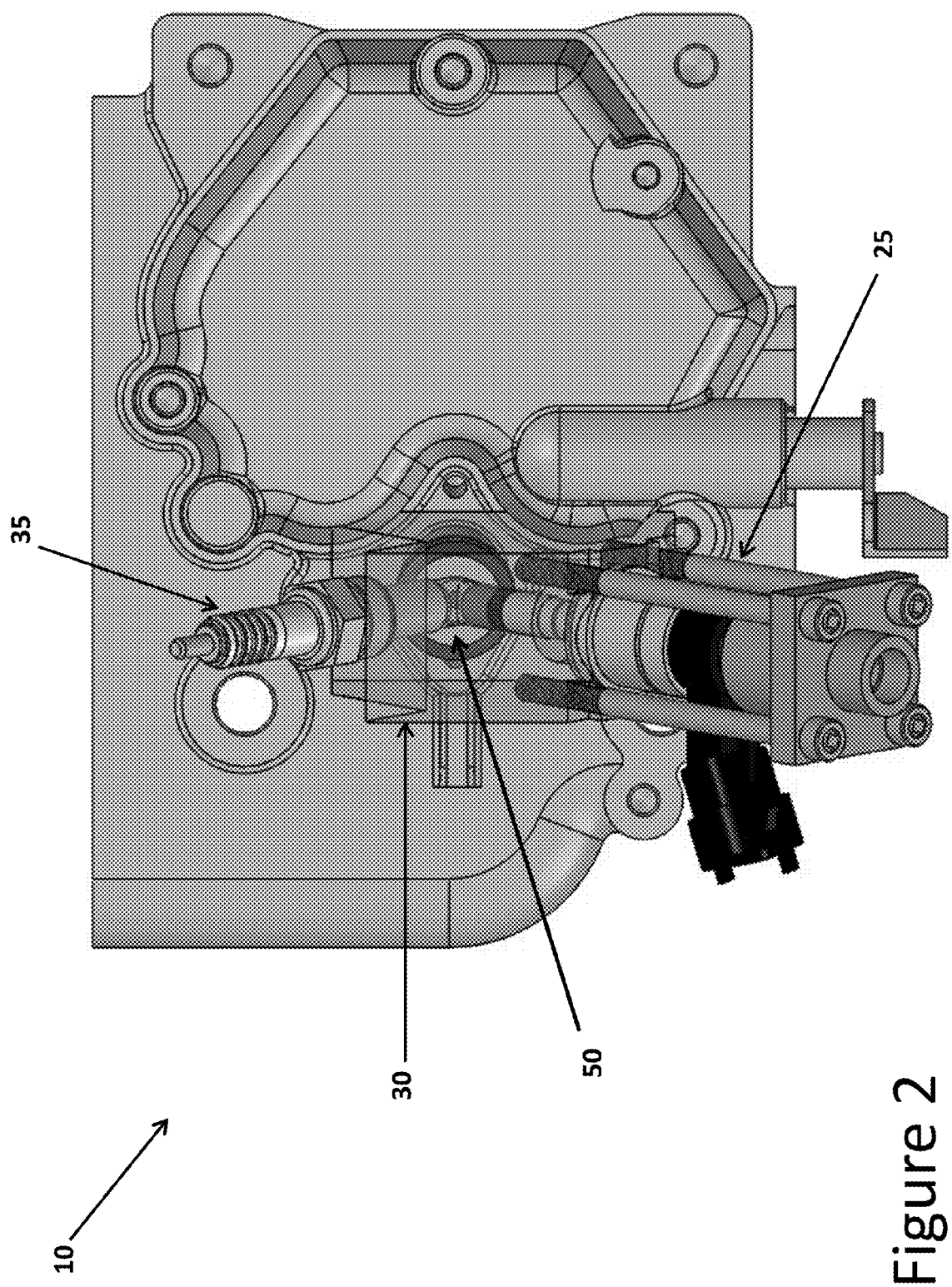
FIG. 2 is an enlarged perspective view of the igniter system of FIG. 1 featuring a transparent view of the igniter housing showing the mixing and combustion chamber.
Figure 3:
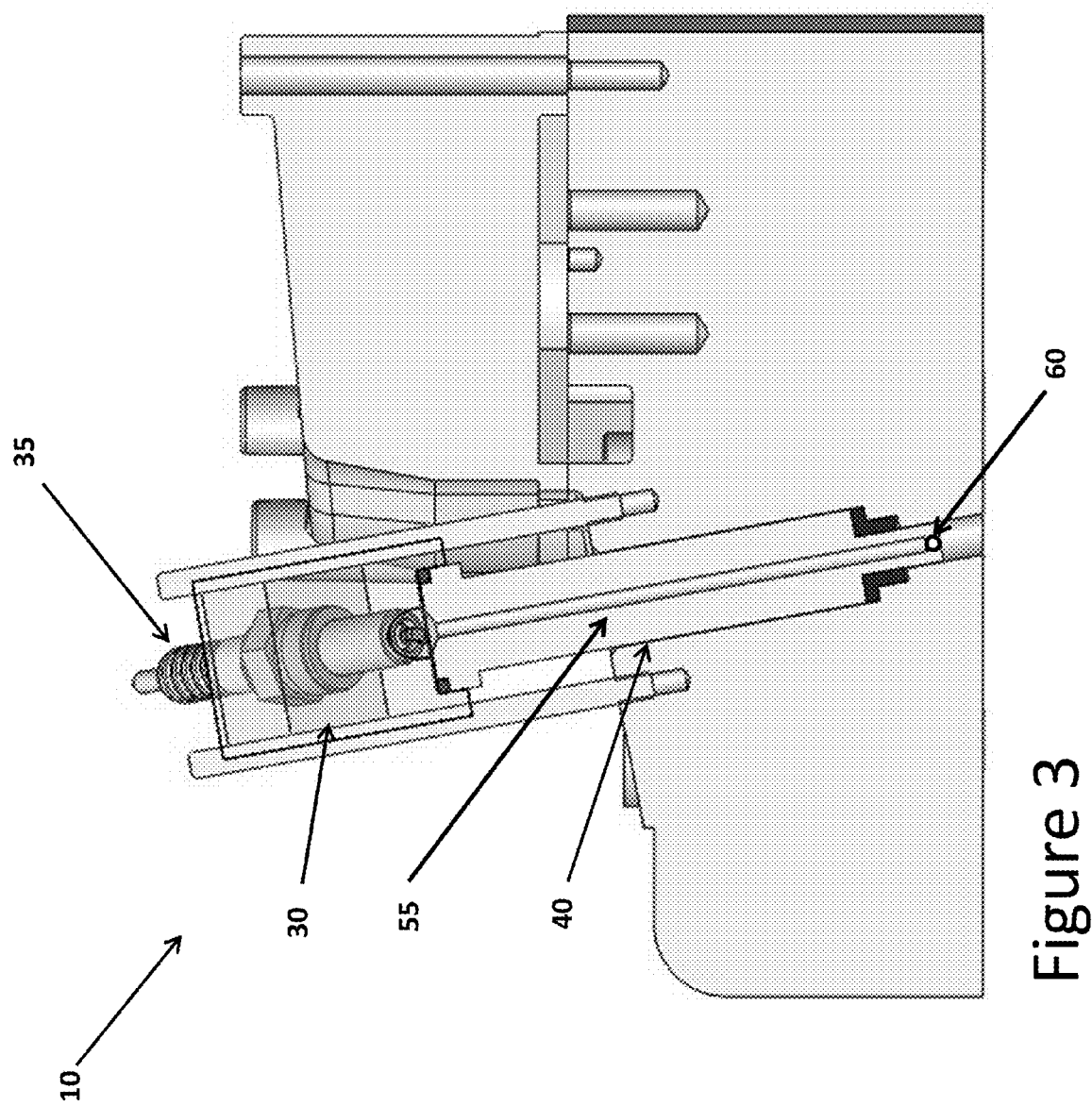
FIG. 3 is a sectional view of the igniter system of FIG. 1 illustrating the igniter tube and internal bore.

Referring to FIGS. 1-3, an igniter system and process for combusting low grade carbon monoxide rich synthesis gas in high compression engines at high thermal efficiency will now be described. In particular, FIG. 1 is a perspective view illustrating an igniter system 10 on a host engine cylinder head 15 of a main cylinder of an engine having one or more cylinders. The igniter system 10 comprises a "gasoline" direct injector 25, an igniter housing 30, a spark plug 35 and an igniter tube 40. By way of example, the host engine may comprise a conventional high compression diesel engine initially outfitted with a top of cylinder direct injector 25. The intake port system of the host engine is then modified to allow the low grade synthesis gas primary fuel source to be mixed with the diesel's unthrottled air supply. Fuel to air mixing rates are typically in the lean burn region with an excess of oxygen. Such a mixture will typically not ignite by diesel compression ignition. The conventional diesel injector can be throttled down to 10%-15% of fuel flow and used as a pilot injection to light the main mixture. However, the synthesis gas mixture will typically burn well into the expansion stroke, thereby causing low system efficiency and high exhaust gas temperatures which, in turn, can be harmful to the engine.

FIG. 2 is an enlarged perspective view of the igniter system 10 of FIG. 1 featuring a transparent view of the igniter housing 30 showing the mixing and combustion chamber 50 within the housing. This chamber 50 includes a high speed, high pressure inlet valve 25 such as the modern gasoline direct injector 25 shown in FIG. 1. FIG. 3 is a sectional view of the igniter system 10 of FIG. 1 illustrating the igniter tube 40 and internal bore 55 within the tube. Igniter tuber 40 also includes one or more output bores 60 at the distal end of internal bore 55. Internal bore 55 may comprise a reduced diameter bore relative to an effective diameter of the combustion chamber 50.

With further reference to FIGS. 1-3, the original diesel direct injector is replaced by an igniter that is specifically designed for combusting low grade carbon monoxide rich synthesis gas in a high compression engine at high thermal efficiency. The igniter tube 40 fits in place of the normal injector body and is capped by a small mixing and combustion chamber 50 within the igniter housing 30. As stated, this chamber 50 includes a high speed, high pressure inlet valve 25 such as a modern gasoline direct injector 25. Opposing this injector 25 is a small (e.g., 8-10 mm) fine point spark plug 35.

A high compression diesel can typically achieve 50 bar peak pressure, which is too high for a normal automotive spark plug to fire. The use of a fine point spark plug with a small gap (e.g., in the 0.02 inch range or less) assures that the ignition spark will travel through the spark plug gap and not outside of the ceramic insulator. An iridium tipped plug can be employed because of its high durability at small pin diameters. In some embodiments, the ignition source is a high voltage, high frequency capacitive discharge unit as typically used in the aftermarket automotive performance market. The high pressure inlet valve 25 can input hydrogen or a hydrogen rich synthesis gas which can be generated as set forth in co-filed Provisional Patent Application No. 61/856,228 titled A COAXIAL GASIFIER FOR ENHANCED HYDROGEN PRODUCTION, the content of which is incorporated herein by reference in its entirety.

Figure 4:
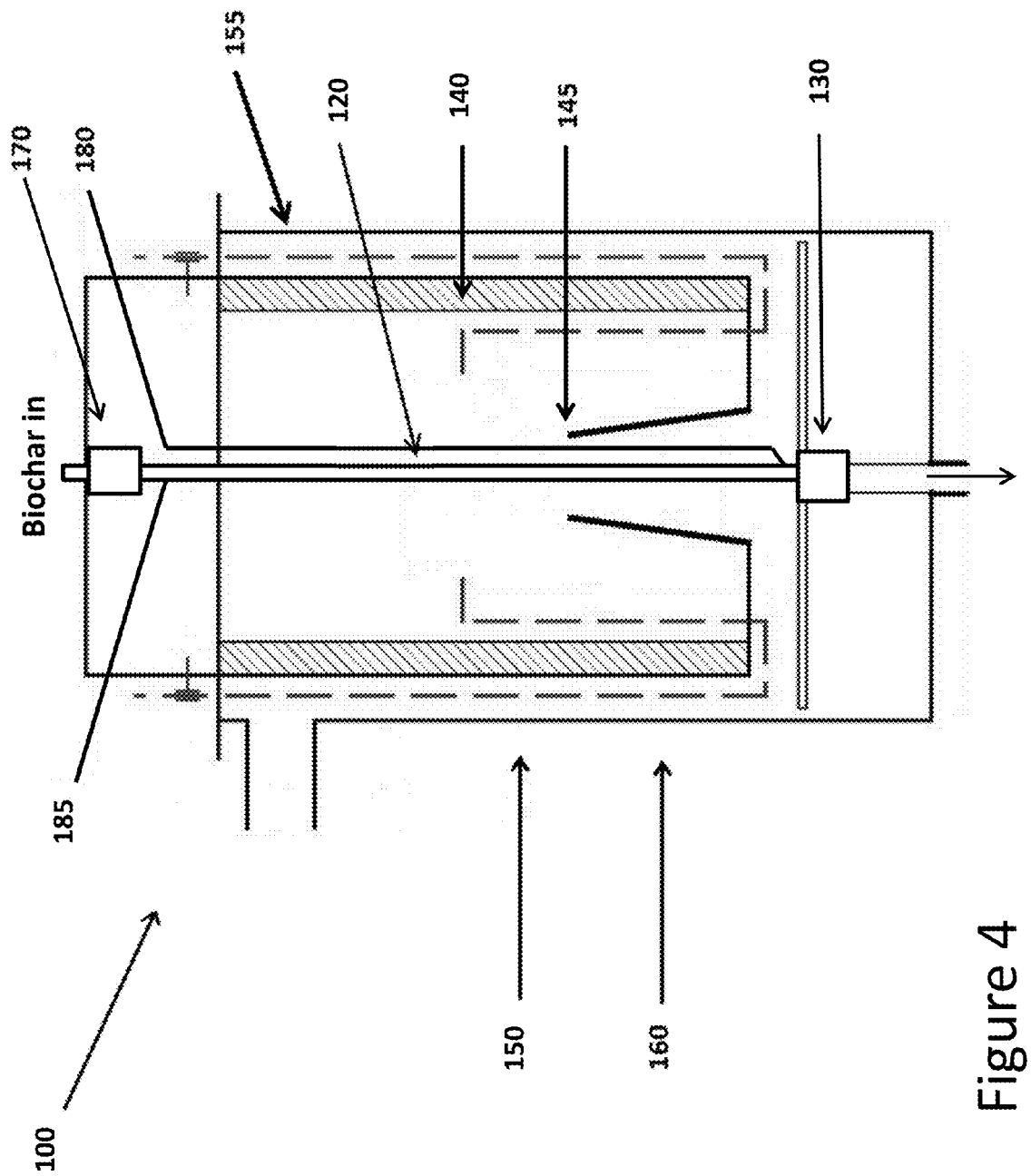
FIG. 4 is a sectional view of a coaxial gas converter in a downdraft gasifier.

FIG. 4 is a sectional view of a coaxial gas converter in a downdraft gasifier 100, in accordance with an embodiment of the invention. By way of example, the downdraft gasifier 100 may comprise a downdraft reactor such as described in the Handbook of Biomass Downdraft Gasifier Engine Systems by Thomas Reed and Agua Das, the content of which is incorporated herein by reference in its entirety. Such a gasifier 100 can be modified, as illustrated in FIG. 4, to include a coaxial gas converter comprising a biochar inlet valve 110, a coaxial char tube 120, and a biochar and ash outlet valve 130.

With further reference to FIG. 4, the downdraft gasifier 100 uses a plurality of air inlet jets 140 to create the hot zone 150 in its reduction bell area 160 when operated on biomass or other carbonaceous materials. The thin walled char tube 120 is coaxially located from the top to the bottom of the gasifier 100 and is substantially circular in cross-section. This tube 120 is filled with highly reduced biochar carbon that can be produced by the main chamber 155 of the host gasifier 100, other gasifier, or other char making device. The input is metered in through biochar inlet valve 170, which may comprise a conventional valve such as a remotely controlled ball valve. The char initially falls into the tube 120 building a standing column of char in the tube 120 which extends above the air inlet nozzles 145 of the main gasifier 155. Under normal operation of the main gasifier 155, an extended hot zone 150 forms from above air inlet nozzles 145 to the bottom of the reduction bell 160. In some embodiments, the hot zone 150 peaks at well over 800 degrees C. and often as high as 1200 degrees C.

Carbon char in tube 120 can be at equilibrium temperature based on the hold time of that char in conjunction with the ratio of open throat diameter to inner tube diameter. By way of example, for a 2½ inch diameter reduction bell opening, a suitable inner tube diameter is ¾ inch. Water vapor can be added on a controlled, on demand, basis through a down tube 180 which pre-heats the steam to the local temperature. When this steam passes through the carbon, conversion to carbon monoxide and hydrogen occurs. The reaction proceeds relatively quickly above 800 degrees C. and is generally usable in the 800 degrees to 1200 degrees C. operating range. A surplus of carbon in the center tube 120 above the hottest zone in the gasifier 100 assures that all intermediate carbon dioxide reduces to carbon monoxide. The resultant approximately 50/50 mix of hydrogen and carbon monoxide passes up the tube 120 through additional standing char and open space to the cooler upper region, and then out through output line 185. If the input biochar is not highly reduced, then additional water vapor and carbon dioxide can be generated in the upper cooler region of the tube 120, thereby degrading the output.

According to an embodiment of the invention, a typical fire sequence of the igniter system 10 comprises: (i) air and low grade synthesis gas is drawn into the cylinder through the four cycle intake stroke and compressed into the igniter tube 40 and chamber 50 at the top of the cylinder; (ii) as the pressure rises, typically to the 30 bar region, at about 20 degrees before TDC, hydrogen rich gas is introduced to the chamber 50; (iii) at 10 degrees or less, the spark plug 35 is fired, igniting the hydrogen rich mixture in the chamber 50 and firing it down the igniter tube 40, typically at supersonic speeds; (iv) this hot, fast burning gas reacts with the small compressed gas pocket at the top of the piston at TDC, causing simultaneous ignition across its volume; (v) the resulting fast burn around TDC provides an optimized pressure spike to drive the piston down at high thermal efficiency; and (vi) the exhaust stroke clears the chamber 50 and igniter tube 40, preparing them for the next firing event.

With further reference to FIGS. 1-3, spark plugs typically cannot survive in the harsh high compression diesel environment. Consequently, the spark plug 35 is placed in a position partially shielded by the bore 55 of the igniter tube 40. The engine is also operated in lean burn mode which limits peak cylinder pressures well below typical diesel peak loads.

According to some embodiments, the hydrogen rich gas valve 25 is closed during the fire event to minimize carbon buildup at the valve seat.

In some embodiments, the length, diameter and geometry of the igniter tube 40 is varied over a wide range with shorter large diameter bore tubes, thus providing the fastest ignition. In other embodiments, longer and narrower bore tubes are employed to provide better spark plug and injector valve isolation and protection.

For supersonic operation, the internal bore configuration of the igniter tube 40 will be highly dependent upon the engine design. In particular, the length of the igniter tube 40 as necessitated by separation of the igniter body from the internal cylinder volume, cylinder displacement, piston cavity geometry, range of design power levels of the engine, design RPM and intended main fuel mixtures all have an effect.

In further embodiments, the combustion chamber and igniter tube internal bores are configured such that a detonation event in the combustion chamber 50 results in hydrogen injection into the main cylinder at supersonic velocities relative to the local speed of sound in the main cylinder.

In embodiments of the invention described herein, the injecting valve must be thermally managed to maintain life. Additionally, the spark plug gap and spark duration must be managed to preclude thermal ignition. Generally, the igniter tube 40 region should be run hotter than the corresponding area of the stock injector to maintain combustion energy, whereas the top of the igniter should be kept cool to maintain durability and to prevent pre-ignition hot spots.

A 500 cubic centimeter per cylinder engine @ 20:1 compression collapses to a 25 cubic centimeter combustion volume @ TDC. For a commercial 10 mm spark plug and small gasoline direct injector, the minimum volume upper mixing and combustion chamber 50 is about 0.8×0.8×0.4 Centimeters, or only 1% of the main combustion volume, thus, only minimally impacting the engine's compression ratio. However, commercial diesel injectors are 10 centimeters long or longer. Assuming a 0.25 centimeter bore igniter tube 40 will degrade the combustion ratio by an additional 2% and can significantly increase the motoring pumping losses because of the gas flow through the long tube bore 55. For these reasons, it is optimal to locate the mixing and combustion chamber 50 as deeply in the engine head as possible, i.e., as close to the main combustion zone as possible. However, both the injector tip and the spark plug gap need to be protected from spurious large combustion events in the main cylinder. Accordingly, some isolation via an igniter tube bore is desirable. Short bore length essentially creates a restricting flange between the main combustion chamber and the ignition chamber. If this flange wall is too thin, it will overheat and erode. For a 500 cubic centimeter cylinder, with a water cooled aluminum head, 4 mm thickness is acceptable dependent upon engine loading/ use patterns.

Basic Principles of Operation:

As per *Hydrogen Storage Technologies,* © 2012 Wiley-VCH, hydrogen combusts over the range of 4% to 75% in air at standard conditions. In contrast, methane combusts over the range of 5% to 15% in air. Under certain conditions, hydrogen can detonate. The detonation range under standard conditions is 18% to 59%. At 50 bar, which is the typical pressure at TDC for high compression diesels, the detonation range is 5.5% to 74% at room temperature. As the temperature increases, the detonation range also increases such that at 700° K, which is a typical peak temperature, the detonation range is 2% to 86% before combustion at TDC.

As per Hysafe.org, which is the international consortium on hydrogen safety, typical auto ignition temperature in hot air is about 950° K. This is about 250° C. above pre-ignition at TDC in small diesels. Hydrogen requires only 0.02 mJ input energy for ignition, much lower than typical hydrocarbons. The laminar burning velocity in air is only about 3 meters per second, but, the detonation velocity ranges from 1500 to 2150 meters per second (the speed of sound is 343 meters per second at standard conditions). The optimal detonation cell size at standard conditions is 15 mm diameter. Susceptibility to detonation declines above and below this size and as the mixing ratio moves up or down from a stoichiometric 29.5%.

Figure 5:
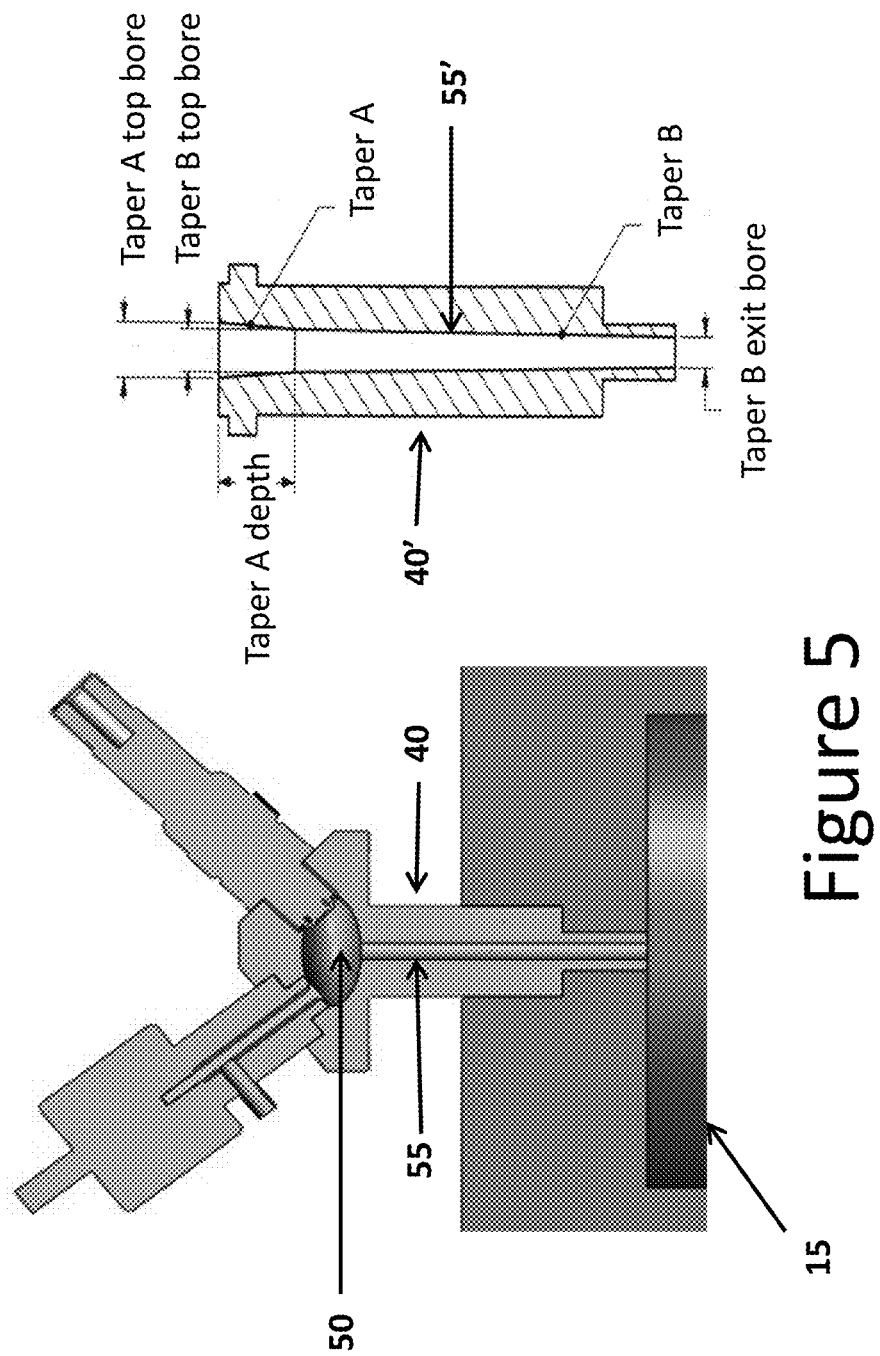
FIG. 5 is a sectional view of an alternative igniter system having an igniter tube with a tapered bore.

Verification of Supersonic Operation:

An igniter housing 30 with sparkplug and gasoline direct injector 25 of FIG. 1 is configured with a 15 mm diameter elliptical mixing and combustion chamber 50, as per FIG. 2 and FIG. 5. It is connected to an 8 mm diameter internal bore igniter tube 40 which is constantly flushed with pressurized air such that the tube's internal pressure is slightly above atmospheric. Omega DLX101-1K ultra-high speed pressure sensors are located in the sidewall of the bore at 100 mm, and 300 mm from igniter housing 30. Overall tube length is 350 mm. Hydrogen is supplied to the injector 25 at 80 bar. Laboratory function generators sequence the opening of the injector 25 and the firing of the spark plug 35 to simulate operation on a typical 1800 RPM (60 Hz) generator. The sensors have a 1000 psi full scale rating and rise time of 1 μs. They are very insensitive to external mechanical shock and sound. Propagation delay between the first sensor and the second sensor is approximately 250 μs at the lean limit of firing and approximately 300 μs at high hydrogen concentrations. This calculates to 812 to 676 meters per second (2666 to 2221 feet per second).

On Engine Comparison to Conventional Ignition Technologies

Three Yanmar LV-100V high compression single cylinder 0.435 liter diesel engines with electrical generators were configured as set forth below. Although these examples involve the use of single cylinder engine, the igniter system 10 set forth herein can be applied to an engine of any size, such as comprising 1-16 cylinders, 0.1 to 5 liters per cylinder and any functional compression ratio. For a reciprocating piston internal combustion engine having one or more cylinders, each cylinder can be fitted with an igniter system with at least one igniter per cylinder.

Engine 1: Conventional factory configuration with direct high pressure injection and factory stock 21:1 compression ratio. This engine's air intake system was modified to accept the output of a small downdraft gasifier and/or low pressure methane and/or hydrogen from lab cylinders.

Engine 2: The factory fuel injector was replaced by a small diameter iridium tipped spark plug. The air intake manifold was configured with a standard high flow port injector. The port injector is fed by hydrogen and/or methane from laboratory cylinders. The port injector can be timed to open in synchronization with the intake valve such that there is minimal residual hydrogen in the intake system between intake strokes. The spark plug modification slightly reduced the compression ratio to the 20:1 range.

Engine 3: Outfitted with an igniter system 10 (e.g., as depicted in FIG. 5) with a 15 mm elliptical diameter mixing and combustion chamber 50 and a 3.5 mm straight bore igniter tube 40. The engine's intake was modified to include both of the intake systems above. That is, it can accept mixed air streams from a small downdraft gasifier and/or methane and/or hydrogen from lab cylinders. It also has a port fuel injector 25 sequenced to the intake valve so that it can be fueled by hydrogen and/or methane through the same type subsystem as Engine 2. The engine can be run on the igniter system 10 alone or in conjunction with any combination of the intake systems. Engine's compression ratio is 18.7:1 due to the dead volume increase of the igniter system.

Engine 1 Testing:

Engine 1 is configured as a conventional diesel pilot injection system. The engine can start and run on diesel, biodiesel or vegetable oil emulsions. If combustible gases are present in the air intake system, they will provide additional combustion energy such that the genset's fixed RPM governor will throttle back the flow to the direct injector to maintain output frequency. This engine runs on a wide range of hydrogen, methane, and/or wood pellet fed syngas down to about 15% pilot injection. Exhaust gas temperatures and system efficiencies vary due to the different combustion rates of different gas mixes against the fixed timing of the mechanical pilot injection system.

Engine 2 Testing:

Engine 2 is configured with conventional spark ignition and a synchronized port fuel injector as typically used in lean burn hydrogen and natural gas engines. However, it has an unusually high compression ratio, 20:1 versus a typical 11:1 and it is not air throttled which means that it cannot maintain a stoichiometric ratio of air to fuel except at one single operating point for fixed RPM operation. However, diesel operation without air throttling provides a significant efficiency improvement over the vacuum pumping losses and degradation in Carnot efficiency due to decreased expansion ratios of air throttling in engines. The engine starts to run smoothly on hydrogen at 900 RPM and can operate to at least 1800 RPM. Since hydrogen can ignite down to under 4% concentration at the high compression of the engine, and operates in lean burn mode to the stoichiometric 29% ratio, this configuration appears serviceable in some applications even though it is not air throttled. However, if even a small amount of methane is mixed with the hydrogen, engine operation becomes erratic and does not fire at all at any useful methane feed rate. Carbon monoxide has an even higher octane rating than methane and a similar narrow range of combustible mixture ratios. Engines of this configuration become more practical at lower compression ratios and with air throttling, but with lower theoretical Carnot limiting efficiencies.

Engine 3 Testing:

Engine 3 can idle directly from the igniter system alone. Power output in this mode is limited by the low conduction of the small bore igniter tube. Power level can be increased by adding hydrogen through the port injector provided that it is synchronized to the intake valve and intake stroke. Adding hydrogen through the air intake is prone to backfiring due to residual hydrogen in the intake and particularly due to a small EGR return port built into the engine's cylinder head. Hydrogen rich syngas from a small downdraft gasifier also runs satisfactorily on the air intake. Methane does not ignite when supplied as the only external fuel to either intake subsystem with the original igniter tube geometry.

As per Hysafe.org's reporting on Russian detonation lab experiments (Russia is a member nation of Hysafe), there is a complex interaction between detonation wavefront propagation and channel geometry. The igniter tube in FIG. 5 was replaced with various alternative igniter tube bore configurations as per the expanded right side of FIG. 5. A bore configuration was found which provides satisfactory operation on the hydrogen igniter system with methane alone or in combination with other input port gasses while maintaining an acceptably high compression ratio. Detonation wavefronts propagate more readily through large diameters, but, the engine cannot tolerate a large diameter channel without a significant loss in compression ratio.

Explanation of Engine 3 Operation on hard-to-ignite high octane main fuels:

The mixing and combustion chamber of FIG. 1 and FIG. 5 is fired with hydrogen and air as the primary fuel mixture which is well above the stoichiometric ratio for hydrogen, but below the detonation limit at 50 bar and 700° K, that is, between 29% and at least 74%. Thus, once all the oxygen in the chamber is consumed in a highly energetic reaction, there is still a substantial excess of hydrogen which is now in an excited state. Hydrogen rich main cylinder mixtures have a very low ignition threshold as per hydrogen, so even relatively poor conduction of the igniter excited hydrogen to the main cylinder chamber can initiate cylinder ignition. However, ignition of higher energy threshold main fuel mixtures requires careful design consideration for the igniter tube length and bore geometry.

Optimized Igniter Tube Geometries for Engine 3

As per FIG. 5, a dual tapered bore igniter tube 40' was found to provide satisfactory results with a wide range of main fuel input mixtures including pure methane. Taper A provides the interface between the elliptical mixing and combustion chamber 50 and the igniter tube 40'. A Taper A top bore of 8 mm provides a satisfactory tradeoff between chamber coupling and degrading the compression ratio. A Taper B exit bore (bottom) of 3 mm was used. Commercially available taper pin reamers were used to set Taper A and Taper B such that the Taper A depth is 15 mm and the Taper B top bore is 5.6 mm.

Igniter Tube General Considerations

In general, the igniter tube 40 must couple an optimized detonation chamber 50 to a conventional high compression cylinder/piston main chamber. Cylinder head water cooling, valve and cam shaft or rocker arm geometries restrict how close the igniter housing 30 can be to the main combustion chamber. This, in turn, limits the conduction of hot hydrogen. Conversely, the hydrogen injector and spark plug 35 should be isolated from the main chamber particularly if low grade bio-syngas is used as a primary fuel due to the potential for particulate contamination and coking. A 0.5 liter per cylinder displacement at 20:1 compression ratio compresses to 25 cubic centimeters. A 5 cubic centimeter volume injector igniter tube and mixing and combustion chamber will substantially degrade the compression ratio and Carnot limiting efficiency. Starting with a higher compression ratio in the 21.5:1 range and minimizing the dead volume of the igniter system 10 can yield compression ratios in the 18:1 to 19:1 range which do not significantly degrade theoretical efficiency.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. An igniter system for a reciprocating piston internal combustion engine having one or more cylinders including at least one igniter per cylinder, the igniter system comprising:
   a combustion chamber connected to a main cylinder of the engine by an igniter tube having a restricted diameter bore, wherein a lean burn fuel mixture is introduced into the combustion chamber by the normal compression stroke of the engine;
   a hydrogen valve that injects a hydrogen rich gas at high pressure near top dead center into the combustion chamber forming a mixture of hydrogen and air having a hydrogen concentration above the stoichiometric ratio for hydrogen and air in the combustion chamber; and
   a spark ignition source that injects hot burning hydrogen into the main cylinder, wherein hot unburned hydrogen is delivered into the main cylinder as a result of the injection and combustion of said hydrogen rich gas,
   wherein an internal bore of the combustion chamber and the restricted diameter bore of the igniter tube are configured such that a detonation event in the combustion chamber results in hydrogen injection into the main cylinder at supersonic velocities relative to a local speed of sound in the main cylinder.

2. The igniter system of claim 1, wherein the hydrogen valve injects the hydrogen rich gas into the combustion chamber before Top Dead Center.

3. The igniter system of claim 1, wherein the spark ignition source fires the mixture either before, on or after Top Dead Center.

4. The igniter system of claim 1, wherein a resulting combustion event expels an excess of hot, burning hydrogen into the main cylinder, thereby initiating cylinder ignition.

5. The igniter system of claim 1, wherein the restricted diameter bore includes a reduced diameter relative to an effective diameter of an internal bore of the combustion chamber.

6. The igniter system of claim 1, wherein the restricted diameter bore includes a dual taper.

7. The igniter system of claim 1, wherein the hydrogen valve is closed during firing of the spark ignition source.

8. An igniter system for a reciprocating piston internal combustion engine having one or more cylinders including at least one igniter per cylinder, the igniter system comprising:
   an igniter tube having a restricted diameter bore;
   a combustion chamber connected to a main cylinder of the engine by the igniter tube, wherein air is introduced into the combustion chamber by a normal compression stroke of the engine;
   a hydrogen valve that injects a hydrogen rich gas at high pressure into the combustion chamber forming a mixture of hydrogen and air; and a spark ignition source that fires the mixture either before, on or after Top Dead Center, wherein an internal bore of the combustion chamber and the restricted diameter bore of the igniter tube are configured such that a detonation event in the combustion chamber results in hydrogen injection into the main cylinder at supersonic velocities relative to a local speed of sound in the main cylinder.

9. The igniter system of claim 8, wherein the igniter tube includes a reduced diameter bore relative to an effective diameter of the combustion chamber.

10. The igniter system of claim 8, wherein a lean burn fuel mixture is also introduced into the combustion chamber by the normal compression stroke of the engine.

11. The igniter system of claim 9, wherein the hydrogen valve injects the hydrogen rich gas into the combustion chamber before Top Dead Center.

12. The igniter system of claim 10, wherein a hydrogen/air ratio in the combustion chamber is above a stoichiometric hydrogen/air ratio for local conditions of pressure and temperature.

13. The igniter system of claim 8, wherein the spark ignition source fires the mixture either before, on or after Top Dead Center.

14. The igniter system of claim 12, wherein a resulting combustion event expels an excess of hot, burning hydrogen into the main cylinder, thereby initiating cylinder ignition.

15. The igniter system of claim 8, wherein the restricted diameter bore includes a reduced diameter relative to an effective diameter of an internal bore of the combustion chamber.

16. The igniter system of claim 8, wherein the restricted diameter bore includes a dual taper.

17. The igniter of claim 8, wherein the hydrogen valve is closed during firing of the spark ignition source.

* * * * *